United States Patent [19]

Puri

[11] Patent Number: 4,999,705

[45] Date of Patent: Mar. 12, 1991

[54] THREE DIMENSIONAL MOTION COMPENSATED VIDEO CODING

[75] Inventor: Atul Puri, New York, N.Y.

[73] Assignee: AT&T Bell Laboratories, Murray Hill, N.J.

[21] Appl. No.: 518,677

[22] Filed: May 3, 1990

[51] Int. Cl.[5] .............................................. H04N 7/13
[52] U.S. Cl. .................................... 358/136; 358/135
[58] Field of Search ............... 358/133, 135, 136, 105; 382/56

[56] References Cited

U.S. PATENT DOCUMENTS

| 4,383,272 | 5/1983 | Netravali et al. | 358/136 |
|---|---|---|---|
| 4,704,628 | 11/1987 | Chen et al. | 358/135 X |
| 4,833,535 | 5/1989 | Ozeki et al. | 358/135 |

OTHER PUBLICATIONS

"Interframe Cosine Transform Image Coding", J. A. Roese, W. K. Pratt and G. S. Robinson, IEEE Transactions on Communications, vol. Com-25, No. 11, Nov. 1977, pp. 1329-1339.

"Scene Adaptive Coder", W-H. Chen and W. K. Pratt, IEEE Transactions on Communications, vol. Com-32, No. 3 Mar. 1984, pp. 225-1984.

"Advances in Picture Coding", H. G. Musmann, P. Pirsch and H-J. Grallert, Proceedings of the IEEE, vol. 73, No. 4, Apr. 1985, pp. 523-548.

"A Memory Control Chip for Formatting Data into Blocks Suitable for Video Coding Applications", R. L. Schmidt, IEEE Transactions on Circuits and Systems, vol. 36, No. 10, Oct. 1989, pp. 1275-1280.

Primary Examiner—Victor R. Kostak
Attorney, Agent, or Firm—Barry H. Freedman

[57] ABSTRACT

A video signal encoder uses three dimensional transform coding on blocks of intensity values and then selects the most significant coefficients for further processing by separating the coefficients into several groups have approximately the same energy and thus approximately the same significance. The intensity values can be error values computed by forming the difference between the actual intensity values and values computed using conditional motion compensated interpolation or motion compensated prediction. The encoder can use both two dimensional and three dimensional transformations, and if desired, adaptively switch between those processing techniques. A complementary decoder recovers the intensity values from encoded signals.

21 Claims, 6 Drawing Sheets

THREE DIMENSIONAL MOTION COMPENSATED VIDEO CODING

TECHNICAL FIELD

The present invention relates generally to the coding of motion-video, and, in particular to conditional motion compensated interpolation (CMCI) or motion compensated prediction (MCP) of video signals three dimensional (3D) block transform coding to significantly improve overall coding efficiency.

DESCRIPTION OF THE PRIOR ART

In various applications such as compact video disc and high definition TV, significant reduction in bandwidth for storage/transmission purposes is desirable. This reduction in bandwidth is usually achieved by exploiting various spatial and temporal redundancies that exist in an input video scene.

In intraframe coding, each frame is encoded independently, exploiting only the spatial redundancies. For example, using two dimensional (2D) discrete cosine transform (DCT) encoding of blocks of intensity values as described in a paper by W. H. Chen and W. K. Pratt entitled "Scene Adaptive Coder", *IEEE Transactions on Communications*, pp. 225–231, March 1984, the transformation converts intensity values of a block of pels to a block of DTC coefficients. After such coding, most signal "energy" is packed into only a few low frequency coefficients. The blocks of DCT coefficients are then quantized, and only the "significant", non-isolated coefficients are retained. The process of selecting significant coefficients is facilitated by a "zig-zag" scan, as described in the above-identified paper by W. H. Chen et al., which allows coefficients to be picked in the order of increasing spatial frequencies, from low to high. Overall, the process of DCT conversion, quatization, and appropriate selection of coefficients can yield a high degree of compression.

In interframe coding, frame differences are first computed to exploit temporal redundancies, and then intraframe coding is employed to exploit spatial redundancies as well. Interframe coding is usually further improved by incorporating motion compensated prediction. In motion compensated predictive (MCP) coding, the movement of objects in neighboring frames is predicted, and the differences between the actual and the predicted intensity values are encoded. This type of coding is illustrated in a review paper by H. G. Mussmann, P. Pirsch, and H. J. Grallert, entitled "Advances in Picture Coding," *Proc. IEEE*, pp. 523–548, April 1985.

Often, the movement of objects can be estimated several frames apart, and MCP encoding applied between these distant frames which become reference frames. The intermediate frames are then interpolated, using motion compensated locations in the reference frames. Then the differences (or errors) between actual and interpolated intensity values are encoded. This type of processing is referred to as motion compensated interpolative coding. It is usually possible to encode interpolative differences with much lower fidelity, as they do not feedback into the predictive coding structure. An example of this type of scheme, also known as CMCI coding, is shown in U.S. Pat. application Ser. No. 07/413520 filed 9/27/89 by B.G. Haskell et al.

While CMCI successfully exploits a significant amount of spatial and temporal redundancy between frames, that technique nevertheless contemplates encoding the interpolative differences of various frames independently, typically by DCT encoding of 2D blocks of differences. This means that correlation between neighboring interpolation difference frames is not fully utilized.

An alternative form of interframe coding, in which both the spatial and temporal redundancies are also exploited, is called three dimensional (3D) interframe coding. Such as scheme involves joint-encoding of intensity values from neighboring frames. An example of this type of coding is shown in a paper by J. A. Rose, W. K. Pratt and G. S. Robinson, entitled "Interframe Cosine Transform Image Coding, " *IEEE Trans. on Commun.*, pp. 1329–1339, November 1977. Even though this type of coding, in principle, can exploit spatio-temporal redundancies, it suffers from an inherent drawback because it fails to take account of the frame movement of objects in a scene.

SUMMARY OF THE INVENTION

The present invention exploits the redundancy in a video signal and significantly improves the overall quality of the reconstructed image by using 3D DCT coding on blocks of interpolation errors computed, for example, using CMCI, or on blocks of prediction errors computed, for example, using MCP.

In the case of CMCI, a 3D block of error values is assembled by (a) forming motion compensated predicted values for elements in spaced apart reference frames, (b) forming interpolated values for pels in at least two intermediate frames, and (c) forming the differences between the interpolated values and the actual values for blocks of pels in the intermediate frames. The differences (error values) for a 3D block of pels, which includes an M by N block of pels from each of P frames, are then transformed to a 3D block of DTC coefficients. Advantageously, only the significant non isolated coefficients that contain most of the energy, are selected, further encoded, and transmitted to a remote receiver or stored locally for application to a utilization device such as compact disc equipment. Coefficient selection is accomplished by extending the concept of "zig-zag" scan (of 2D blocks) to a "zig-zag-zog" scan, which traverses coefficients of a 3D block in approximately the order of increasing spatio-temporal frequencies, from low to high. This permits, several high frequency coefficients, as well as isolated significant coefficients in the scan, to be discarded. Conceptually, selection of significant DTC coefficients is enabled by assigning each coefficient to one of several groups, such that, the coefficients belonging to each group possess nearly the same spatio-temporal frequencies. The encoding process is accomplished by further processing coefficients only from certain of the groups.

In an adaptive version of CMCI, the encoder can be arranged to switch between 3D blocks of error values (as explained in the previous paragraph) or 2D blocks of error values, depending upon the characteristics of the input video.

In the case of MCP, steps (b) and (c) above are modified so that motion compensated prediction values are used instead of interpolated values, and one reference frame is sufficient.

BRIEF DESCRIPTION OF THE DRAWING

The present invention will be better understood by consideration of the following detailed description when read in light of the accompanying drawing, in which.

DETAILED DESCRIPTION

Figure 1:
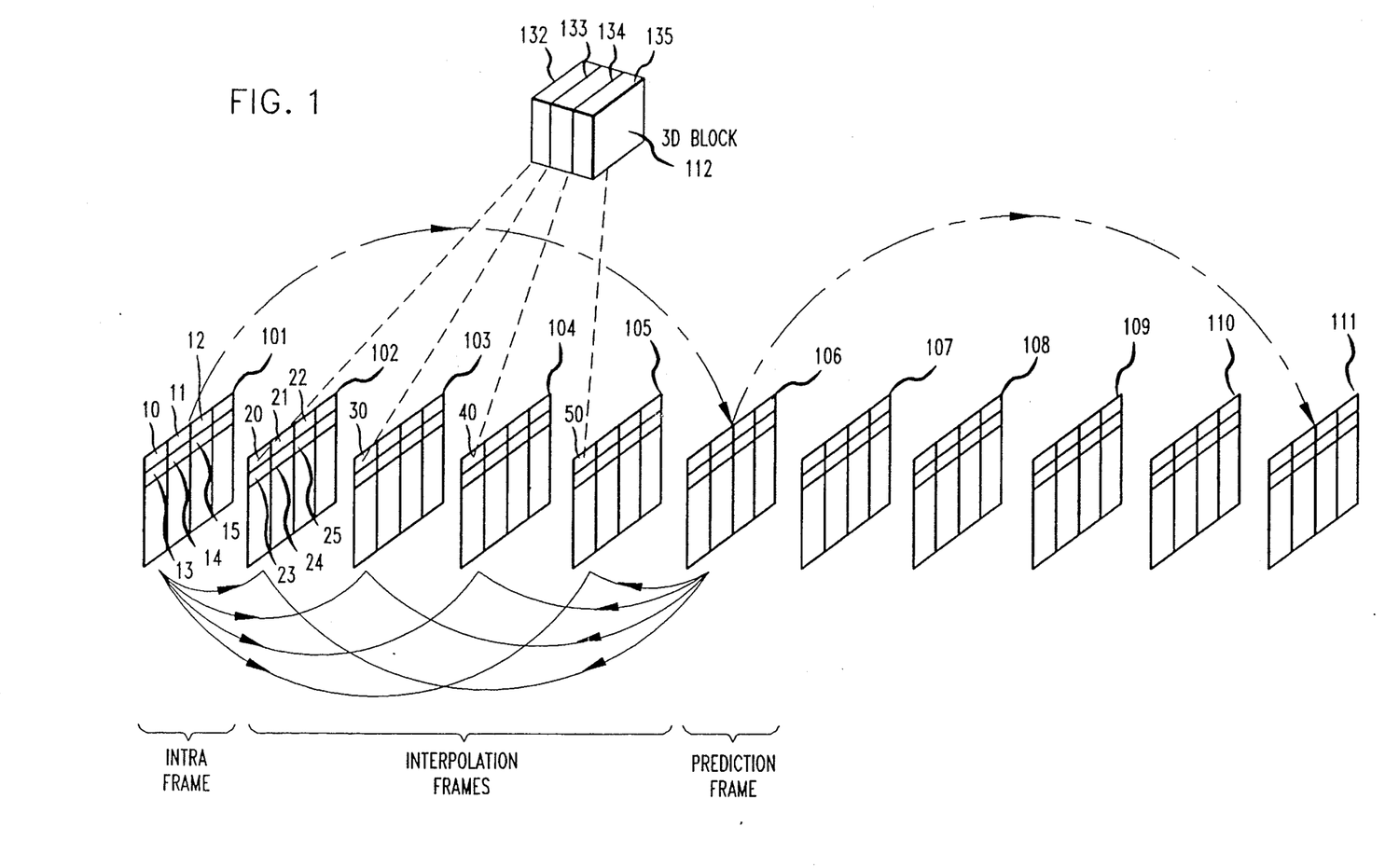
FIG. 1 shows the interrelationship of several frames of a video signal which can be processed in accordance with my invention.

Referring first to FIG. 1, a series of frames 101 to 111 is illustrated. Each frame, such as a frame 101, includes a plurality of blocks of picture elements (pels) such as a blocks 10-15 in frame 101, blocks 20-25 in frame 102, and so on. Each block is in turn made up of a rectangular grid of M×N pels each pel having one or more associated values, obtained by sampling the video signal at appropriate instants. The values can represent intensity in the case of a monochrome signal, or luminance and chrominance in the case of a color signal. In FIG. 1, frame 101 occurs first, followed by frame 102, frame 103, and so on.

While numerous encoding techniques are available, FIG. 1 shows an example of the relationship between a series of frames when predictive interframe coding and four frame interpolation is used to process video signal intensity values. First, blocks of pels in frame 101 are coded using intraframe DCT encoding, and the encoded version is decoded locally to form a reconstructed frame.

This is done so that the transmitter and receiver will process signals in largely the same way. Next, using the intensity values of pels in the original frame 106, estimates of movements of objects (motion vectors) are computed with respect to frame 101, and corresponding intensities of objects at these displaced locations are differenced with the original frame 106. This results in formation of motion compensated prediction error (MCPE) values for pels in frame 106. This MCPE frame is then DCT encoded. Again, to be certain that the transmitter and receiver can track each other, frame 106 is also locally decoded at the transmitter, and the motion compensated prediction errors are added to the previous reconstructed version to form a reconstructed version of the present frame 106.

Now, using the reconstructed versions of frames 101 and 106 as reference frames, and also using the estimated movement of objects for frame 102 with respect to these frames, interpolated intensity values for pels in frame 102 are calculated using intensities of objects at displaced locations in the frames 101 and 106. This is referred to as forming motion compensated interpolation (CMCI) estimates of frame 102. When these estimates are differenced with the original frame 102, a motion compensated interpolation error (MCIE) frame is produced. Similar MCIE frames are also computed for frames 103, 104 and 105, again using reconstructed versions of frames 101 and 106 as the reference.

In accordance with the present invention, interpolation errors for M×N blocks 20, 30, 40 and 50 of intensity values from the same location in the P=4 MCIE frame 102, 103, 104 and 105 are combined to form a three dimensional (3D) block, such as block 112, which is jointly coded by DCT encoding. The encoding procedure for all of the other blocks in frames 102-105 is then repeated. Likewise, the processing of frame 111 follows that for frame 106, while frames 107, 108, 109 and 110 are encoded much like frames 102, 103, 104 and 105, and this process is repeated for the following frames.

The 3D coding procedure applicable to the interpolation error values represented by block 112 will be described more fully in mathematical terms, below. However, at this point, it is to be observed that block 112 includes "planes" 132-135, each plane corresponding to an MCIE frame 102-105, respectively. Plane 132 includes the error values for pel block 20 in the upper left corner of frame 102. In a typical embodiment, block 20 may comprise an 8 by 8 pel block. Similarly, planes 133-135 each represent blocks 30, 40 and 50, located in the same spatial position in frames 103-105. Thus, it is seen that block 112 represents, cumulatively, interpolation error information in three dimensions: two spatial dimensions for each frame, as well as the time dimension, since several frames (e.g., four) are involved.

Figure 2:
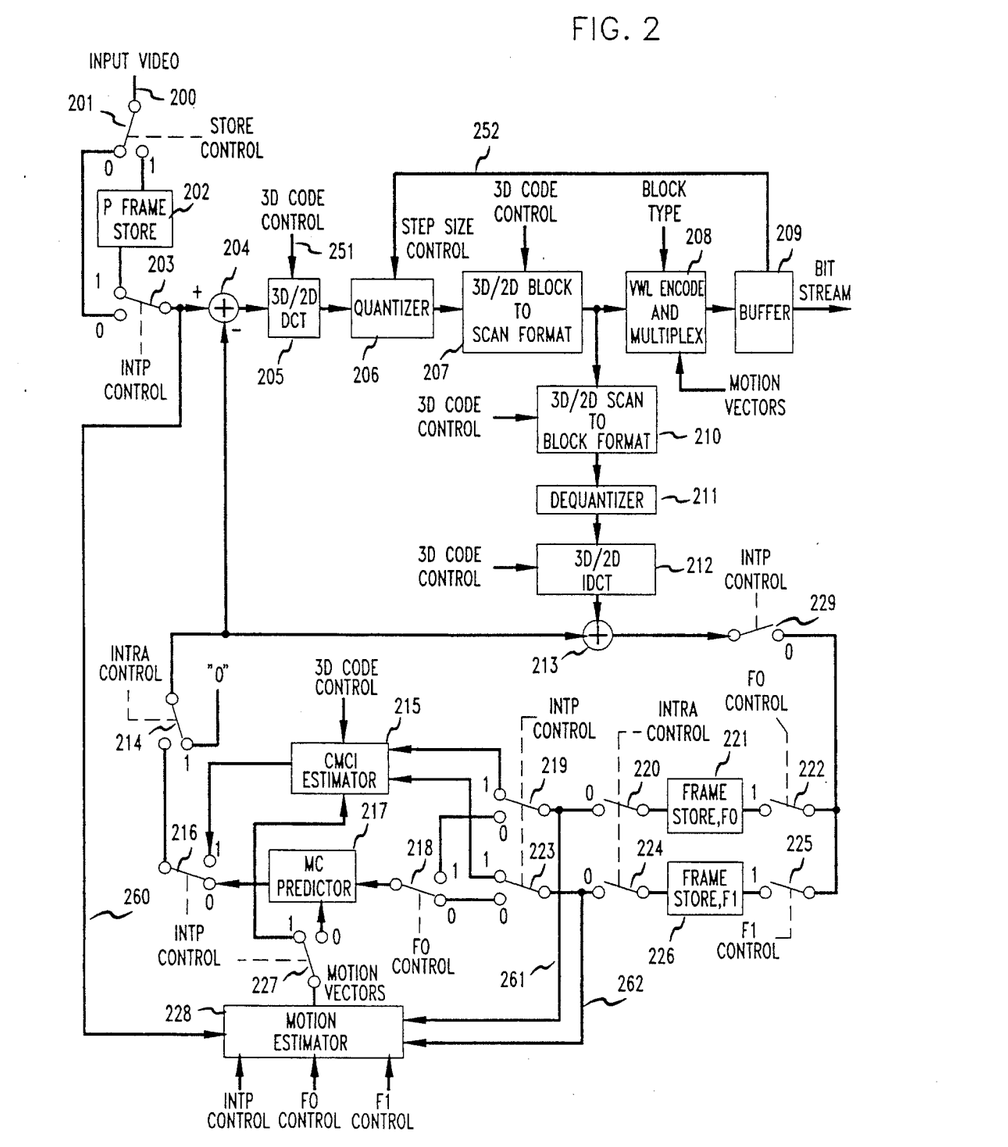
FIG. 2 is a block diagram of an encoder arranged in accordance with the principles of the present invention.

Referring now to FIG. 2, a block diagram of an encoder arranged in accordance with present invention is shown. The encoder is arranged to perform several types of coding, namely intraframe or motion compensated predictive coding, which is necessary for frames 101, 106, 111 etc., and motion compensated interpolative coding, which is necessary for frames 102-105, 107-110, etc. In the following discussion, for the purpose of simplicity, the term "predictive coding" is used to denote "motion compensated predictive coding", and the term "interpolative coding" is used to denote "motion compensated interpolative coding."

The input video signal applied to switch 201 on line 200 is assumed to be available in the form of intensity values from a series of pel blocks of desired size M×N. This may be accomplished by applying the output of a c conventional video line by line scan device (a tv camera or the output of a video recorder) to a block converter, which can be implemented as described in a paper by R. L. Schmidt entitled "A Memory Control Chip for Formatting Data into Blocks Suitable for Video Coding Applications", *IEEE Transactions on Circuits and Systems*, pp. 1275-1280, October 1989. If the signal on line 200 represents an input frame to be intraframe or predictive coded, frame store 202 is dasabled, by opening switch 201 under the control of a store control signal. Frame store 202 is enabled to receives a frame if the frame is to be interpolative coded. Since several frames, illustratively P=4 frames 102-105 may await interpolative coding at any one time, store 202 must be arranged to have the requisite capacity to store P frames.

For both intraframe and predictive coding, switch 203 is adapted to receive the video signal directly from switch 201, and not frame store 202, since the interpolation control signal INTP is low at this time. As stated previously, this signal consists of 2D blocks of M×N intensity values which are fed to a differencer 204, along with 2D blocks of M×N prediction intensities obtained at the output of switch 214. However, for intraframe coding, the prediction signal is set to zero because the INTRA signal controlling switch 214 is high at that time, indicative of ongoing intrafame coding. The difference between the input and the prediction intensity values for each block is then fed to a transformation circuit 205, where a discrete cosine transformation operation is performed, resulting in generation of a block of coefficients. While the operation of transformation circuit 205 will be explained in greater detail below, it is to be noted here that an INMOS model IMS A121 image processing chip may be used for this purpose. Two dimensional rather than three dimensional transformation is provided in transformation circuit 205 at this time, by arranging the 3D control input on line 251 to be low during intraframe processing.

The transform coefficients produced in transformation circuit 205 are then normalized in a quantizer 206, producing quantized coefficients that can attain one of several predetermined levels. The function of quantizer 206 is to divide input coefficients by a predetermined step size, and output scaled values. For example, if a coefficient value is 19 and the scaling factor is 8, the quantizer output is 19/8=2, since the fractional part of the result is discarded. Quantization may be effected in many different circuits well knows to those skilled in the art, such as by using the JPEG Image Compression Processor, model CL 550A marketed by C-Cube Microsystems. If desired, an input can be applied to quantizer 206 from buffer 209 on line 252, such that the quantizing parameters are adjusted, depending on the fullness of buffer 209. This is done so that smaller step sizes are used when buffer 209 is not too full, while larger sizes are employed if buffer overflow is imminent.

The quantized coefficients for each 2D block are input to a block to scan formatter 207, which selects the particular coefficients to be "retained" and processed further for transmission to a receiver or other utilization device. Where 2D coding is involved, selection may be accomplished in a zig-zag scan, described above, which identifies coefficients havint the greatest energy. This process can be implemented using the above identified C-Cube Microsystems device. The selected coefficients, as well as a block type classification signal (which indicates that 2D coding was performed) and motion vectors generated by motion estimator 228 are multiplexed and encoded in a variable word length (VWL) encoder 208. To insure that the encoder output signal occurs at a regulated rate, the output VWL encoder 208 is applied to buffer 209 before it is transmitted to a remote receiver or applied to a utilization device.

For the purposes of computing a local reconstruction of the present frame, the selected DCT coefficients from formatter 207, are applied to scan to block formatter 210, which receives selected coefficients in one order and allows them to be re-ordered in their "unselected", original form. Thus, formatter 210 performs the inverse operation from formatter 207. The re-ordered coefficients are then applied to dequantizer 211, which performs conversion of scaled values back to the original values by multiplying the input by a scaling factor. In the example given above in connection with quantizer 206, the value 2 is multiplied by the scaling factor 8 to obtain the value 16. While this differs from the original value of 19, it is always true that some amount of accuracy is always lost in the quantization/dequantization process. The trade-off, however, is increased coding efficiency (compression). The output from dequantizer 211 is then returned from the transform domain to the intensity domain in inverse transformation circuit 212. This process produces a 2D block of intensity values, which forms a first input to adder 213. The output of switch 214 forms the other input to adder 213; however, as started previously, this output is set to zero for intraframe coding.

During intraframe encoding, switch 229 is in its closed position since the INTP control signal applied thereto is low. This allows the reconstructed frame signal output from adder 213 to be stored in either frame store 221 or in frame store 226, depending on the status of control signals F0 and F1 which control switches 222 and 225, respectively. For intraframe coding, a high INTRA control signal leaves switches 220 and 224 in open position, disconnecting the rest of the circuit including switch 214. Controls signals F0 and F1 are described further below, in connection with FIG. 9.

Figure 4:
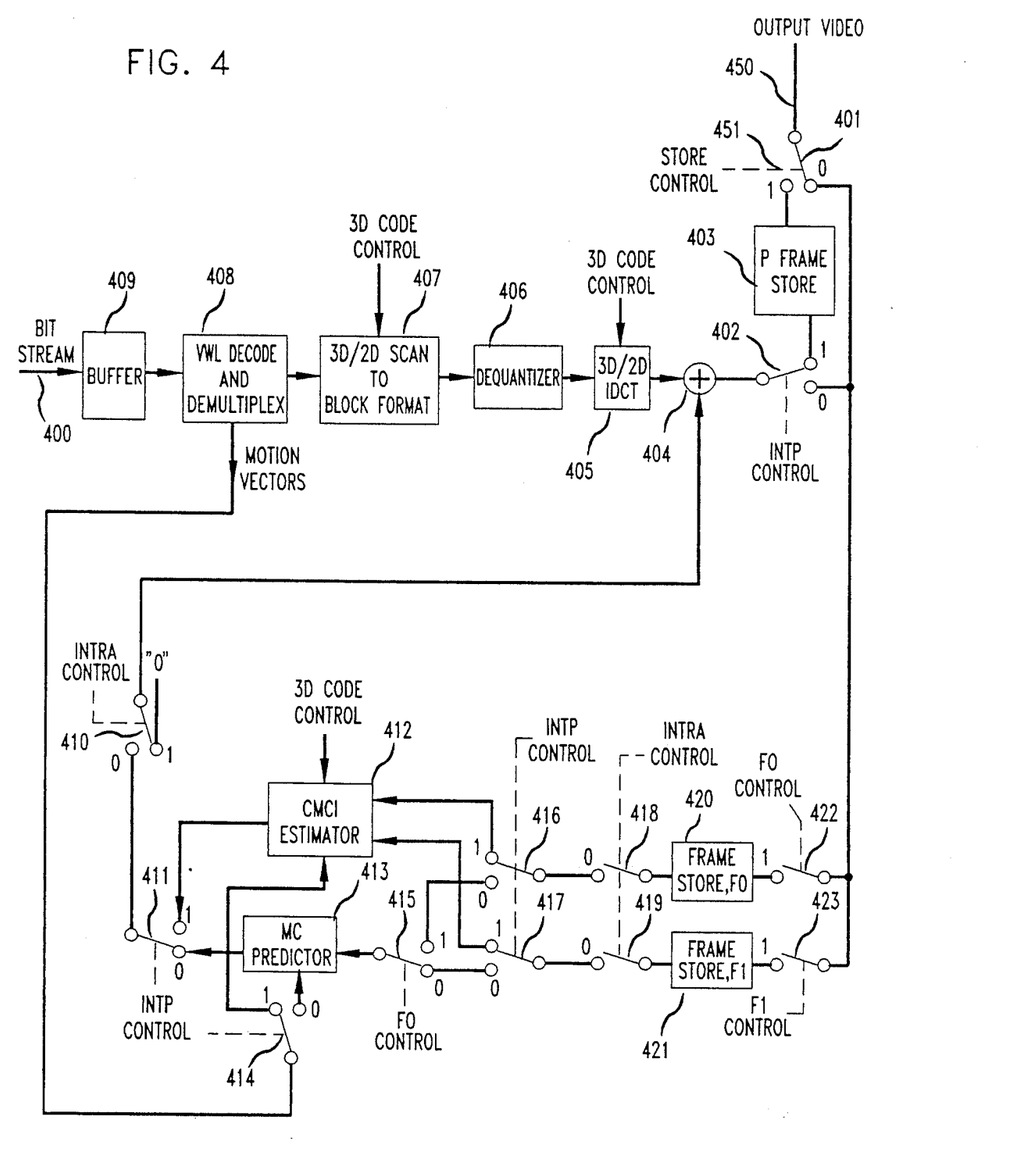
FIG. 4 is a block diagram of a decoder arranged in accordance with the present invention.

During the predictive and interpolative coding processes, the stored values in frame stores 221 and 226 are used. At this time, the INTRA control signal is low, so that switches 220 and 224 are closed, connecting the output of frame stores 221 and 226 to switches 219 and 223, respectively. These switches, together with switch 218, under the control of an F0 control signal, route the frames in frame stores 221 and 226 appropriately, to either motion compensated predictor 217 or to CMIC estimator 215. Concurrently, the frame that is then available at the output of switch 203, as well as the stored frames in frame stores 221 and 226, are applied via lines 260, 261 and 262 to a motion estimator 228, which, depending on the states of F0 and F1 control signals, uses either of the stored frames as a reference for calculation of motion vectors. Details of motion estimator 228 can be obtained from the paper "advances in Picture Coding" by H. G. Musman, et al., cited above. In addition, the CCITT Reference Model for Visual Telephony (H.261) is another very useful reference for this purpose. The motion vectors generated in motion estimator 228 are applied via switch 227 to motion compensated predictor 217, which computes predicted values for the current pel block. These values pass through switch 216 (INTP control signal low) and switch 214 (INTRA control signal low) and form the second inputs to differencer 204 and adder 213. The motion vectors we also multiplexed and encoded by encoder 208, so that they are available at the decoder. (FIG. 4).

When frames, such as frames 102–105, are to be processed using interpolative coding, switch 203 is actuated by a high INTP control signal so as to take its input from frame store 202. This input advantageously consists of M×N blocks of intensity values for each of P frames, which are fed to differencer 204, along with blocks of interpolation intensity estimates (described below) for the same blocks, obtained at the output of switch 214. The differences thus formed are fed to transformation circuit 205, where the DCT operation is performed on 3D blocks of M×N×P intensity values.

A high 3D CODE control signal on line 251 switches transformation circuit 205 from the 2D to the 3D mode. The calculation process, described more fully below, results in generation of $M \times N \times P$ coefficients for each block, which are then normalized in quantizer 206, resulting in quantized coefficients similar to those described earlier in connection with intraframe or predictive coding. The quantized coefficients for each 3D block are input to formatter 207 and processed in accordance with the present invention to select the significant coefficients, which are retained for further processing. The selected coefficients, block type classification, and motion vectors are multiplexed and encoded in variable word length encoder 208, in a manner previously described in connection with intraframe or predictive coding.

For the purposes of computing a local reconstruction or estimate of the interpolated frames, the selected coefficients output from formatter 207, are reformatted or re-ordered to their original, unselected form, in formatter 210. They are then dequantized and inverse transformed in transformation circuit 212 to produce a 3D block of intensity values. This block forms a first input to adder 213, while the output of switch 214 forms the other input.

During interpolation, the INTP control signal is high, maintaining switch 229 in an open position, so that the reconstructed interpolation estimates do not feedback into the predictive coding loop. Rather, the reconstructed frames stored previously in frame stores 221 and 226 are output via closed switches 220 and 224 (INTRA control signal low) to switches 219 and 223. Since the INTP control signal is high during interpolation, switches 219 and 223 apply the stored frames to CMCI estimator 215. This circuit forms estimates of the value of pels in the P intermediate frames based jointly upon the values of pels in previously and subsequent reference frames as well as the motion of objects in those frames.

Concurrently, the stored frames available at the output of switch 203, as well as the stored frames available at the output of switches 219 or 223, are used for calculation of motion vectors in motion estimator 228. The switch 227 is now positioned via a high INTP control signal to allow motion vectors to be applied to CMCI estimator 215. The latter outputs its estimates for pels in the $M \times N \times P$ block which pass through switches 216 and 214 and form the second input to differencer 204 and adder 213.

Figure 9:
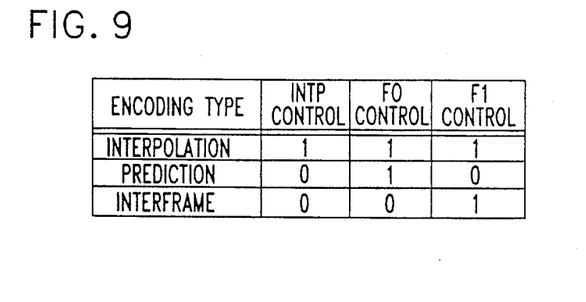
FIG. 9 shows the relationship of some of the control signals used in the encoder of FIG. 2.

The relationship between the F0, F1 and INTP control signals is illustrated in FIG. 9. Specifially, whenever the INTP control signal is high, so are both the F0 and F1 control signals, i.e., both frame stores 221 and 226 can be read out to allow computation of CMCI estimate that has to use both frame stores. When the INTP control is low, it means either intraframe or motion compensated predictive coding is taking place. In that case, the processed frame is stored in one of the two frame stores 221 or 226, so that F0 or F1 are alternately high. First, an intraframe coded frame is stored in frame store 221, with F0 high. Then, the next predictive coded frame is entered in frame store 226, with F1 high. The following predictive coded overwrites the contents of frame store 221, and the following predictive coded frame overwrites the contents of frame store 226. This way, whenever a CMCI estimate is computed, there are two reconstructed frames (past and future) available in frame stores 221 and 226, to act as reference frames.

While described previously, it is to be noted here that the function of differencer 204 is to provide a difference or error signal which represents the difference between the actual value of a pel as applied via switch 203, and an estimated value computed by either motion compensated interpolation or motion compensated prediction. This difference signal is processed in the encoder and forms the basis for the signal that is applied via buffer 209 to a decoder or other utilization device. This difference is also the basis for the signal applied to one input of adder 213 via transformation circuit 212.

The function of adder 213 is to combine the difference signal just described with the estimated values computed using CMCI or MCP. This forms the recovered signal that is applied to frame stores 221 and 226, which in turn is used for processing of subsequent frames.

Details of various operations performed in the coder of FIG. 2, including details of the two dimensional transformations and inverse transformations performed in DCT/IDCT transformation circuits 205 and 212, quantization performed in quantizer 206, 2D block to "zig-zag" scan/"zig-zag" scan to 2D block formatting, as performed in formatters 207 and 210, motion compensated prediction as performed in predictor 217, variable word length coding performed in VWL encoder 208, and buffer step size control of quantizer 206, can be found in the CCITT Reference Model for visual telephony [H.261], and are generally well understood. Details of CMCI processing as performed in CMCI estimator 215 can be found in U.S. Pat. application Ser. No. 07/413520 filed 9/27/89 by B. G. Haskell et al. In the following description further details of 3D DCT/IDCT block formatting and 3D block to "zig-zag-zog" scan and 3D block formatting are given.

In the 3D DCT transform operation provided in transformation circuit 205, the difference (error) values for a block of pels s(m,n,p) of size $M \times N \times P$ is converted into a block of coefficients given by c(j,k,l). The conversion process, which is separable, can be described by the following equation:

$$c(j,k,l) = Za(j)a(k)a(l) \sum_{m=0}^{M-1} \sum_{n=0}^{N-1} \sum_{p=0}^{P-1} s(m,n,p) \cos\frac{(2m+1)j\pi}{2M} \cos\frac{(2n+1)k\pi}{2N} \cos\frac{(2p+1)l\pi}{2P} \quad (1)$$

where, $$a(u) = \begin{cases} \frac{1}{\sqrt{2}} & u = 0 \\ 1 & u \neq 0 \end{cases} \quad (2)$$

and $$Z = \sqrt{\frac{2}{M}} \sqrt{\frac{2}{N}} \sqrt{\frac{2}{P}} \tag{3}$$

The inverse DCT transform of a 3D block of coefficients, as performed in transformation circuit 212, is given by:

$$s(m,n,p) = Z \sum_{j=0}^{M-1} \sum_{k=0}^{N-1} \sum_{l=0}^{P-1} a(j)a(k)a(l)c(j,k,l)\cos\frac{(2j+1)m\pi}{2M} \cos\frac{(2k+1)n\pi}{2N} \cos\frac{(2l+1)p\pi}{2P} \tag{4}$$

When M=N, and substituting the value of Z, from Eq. (3), the forward and inverse transforms in Eqs. 1 and 2 simplify to, $$c(j,k,l) = \frac{2}{N} \sqrt{\frac{2}{P}} a(j)a(k)a(l) \sum_{m=0}^{N-1} \sum_{n=0}^{N-1} \sum_{p=0}^{P-1} s(m,n,p)\cos\frac{(2m+1)j\pi}{2N} \cos\frac{(2n+1)k\pi}{2N} \cos\frac{(2p+1)l\pi}{2P} \tag{5}$$

and, $$s(m,n,p) = \frac{2}{N} \sqrt{\frac{2}{P}} \sum_{j=0}^{N-1} \sum_{k=0}^{N-1} \sum_{l=0}^{P-1} a(j)a(k)a(l)c(j,k,l)\cos\frac{(2j+1)m\pi}{2N} \cos\frac{(2k+1)n\pi}{2N} \cos\frac{(2l+1)p\pi}{2P} \tag{6}$$

To compute the dynamic range in which all DCT coefficients must lie, we first compute the maximum value of the DC coefficient:

$$C_{max}(0,0,0) = 2 \times \frac{1}{\sqrt{\frac{2}{M}} \sqrt{\frac{2}{N}} \sqrt{\frac{2}{P}}} \times S_{max} \tag{7}$$

For the case when M=N=8, and P=4, equation (7) reduces to:

$$C_{max}(0,0,0) = 8 \times \sqrt{2} \times S_{max}$$

If the input data is in the range of 0 to 255, i.e., if each pel can have one of 256 possible intensity values, then equation (8) indicates that DCT coefficients in the range from 0 to 2895 are expected. For input data in the range from −255 to 255, the DCT coefficient range is between −2896 and 2895.

Figure 3:
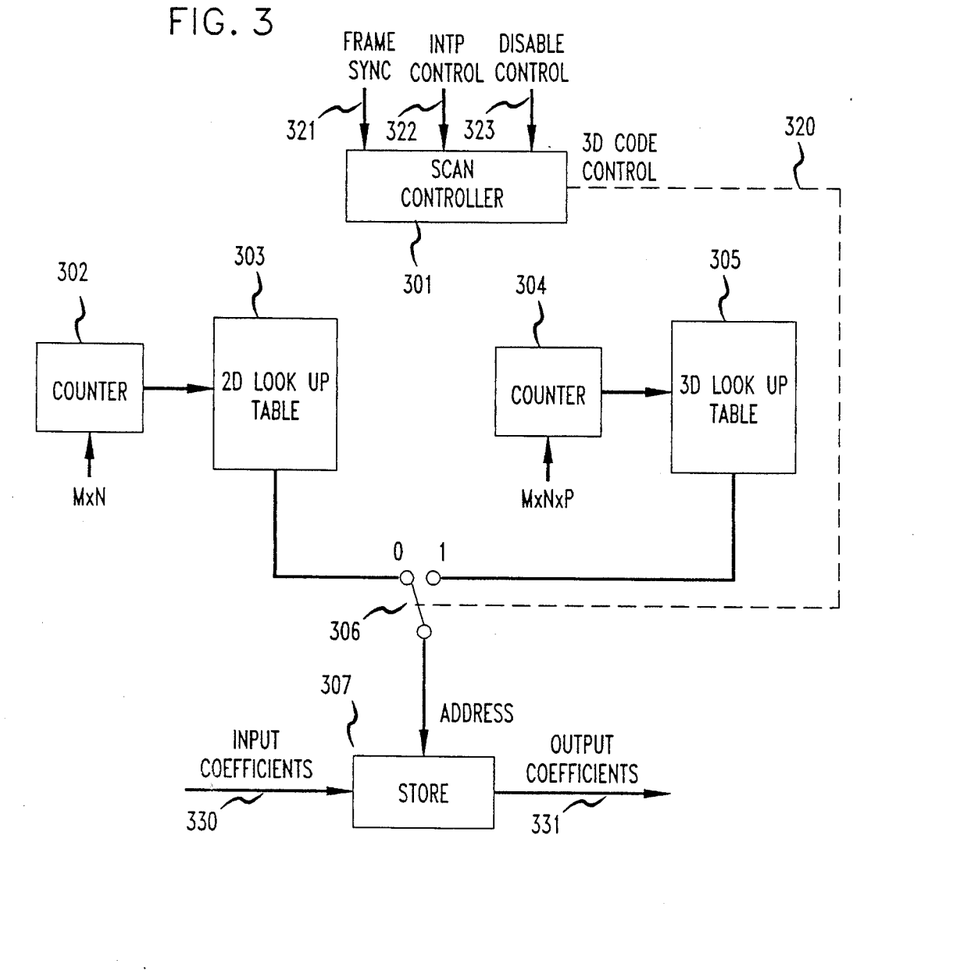
FIG. 3 is a block diagram illustrating the arrangement of block-to-scan and scan-to-block formatters 207 and 210 of FIG. 2.

FIG. 3 shows details of one arrangement of 3D/2D block to scan formatter 207 of FIG. 2. We first explain its operation for 2D block to scan formatting, and then for 3D block to scan formatting. In FIG. 3, scan controller 301 is a device that performs simple boolean logic to generate a 3D code control signal on line 320, based on the status of frame sync, INTP control, and disable control signals on lines 321-323, respectively. The look up table (LUT) 303, which may be a ROM, is loaded with a table of locations which accomplish a "zig-zag" scan within a two dimensional, M×N block, as counter 302 counts the M×N locations within the block. An example using a 4×4 block will illustrate. In this example and in Table 1 below, pels are identified by a 2 digit code indicating row and column location. For example, pel 11 is in row 1, column 1, while pel 24 is in row 2, column 4. When the DCT transformation is produced in accordance with equation (3), 16 coefficients are generated. In accordance with the CCITT Reference Model for Visual Telephony [H.261], the order in which the coefficient values are selected is preferably as follows; 11, 12, 21, 31, 22, 13, 14, 23, 32, 41, 42, 33, 24, 34, 43, 44. This is accomplished by arranging the contents of LUT 303 so that the proper sequence is output as counter 302 counts from 1 to 16. The relationship between the input and output of LUT 303 is thus as follows:

TABLE 1

| Input to LUT 303 | Output From LUT 303 |
| --- | --- |
| 1 | 11 |
| 2 | 12 |
| 3 | 21 |
| 4 | 31 |
| 5 | 22 |
| 6 | 13 |
| 7 | 14 |
| 8 | 23 |
| 9 | 32 |
| 10 | 41 |
| 11 | 42 |
| 12 | 33 |
| 13 | 24 |
| 14 | 34 |
| 15 | 43 |
| 16 | 44 |

The codes output from LUT 303 serve, in turn, as address inputs to a coefficient store 307, which also may be implemented as a ROM. This stored receives coefficient input to formatter 207 of FIG. 2 on line 330, and outputs selected ones of the coefficients, on line 331, in the desired sequence. During 2D selection, scan controller 301 provides a low 3D code control signal to switch 306, thereby connecting LUT 303 to store 307. As counter 302 is incremented, an address for one stored coefficient in a block is output from LUT 303 and applied to the store 307. Thus, the stored coefficient from the specified address in store 307 becomes available on line 331. This procedure is repeated and continues until all addresses corresponding to a count of M=N have been output from LUT 303, and thus all coefficients in store 307 have been accounted for. For each new input block of coefficients on line 330, the entire process is repeated.

In accordance with the present invention, the operation for 3D block to scan conversion can be accomplished in an analogous manner, although the strategy for the selection process is an important part of the invention. The look up table (LUT) 305 is loaded with a table of locations to accomplish what I have called a "zig-zag-zog" scan within the three dimensional, M×N×P block, and counter 304 is set to count M×N×P locations within the block. Meanwhile, a 3D block of coefficients arrives and is immediately stored in coefficient store 307. With the INTP control signal high, scan controller 301 generates a high 3D code control signal, thereby connecting LUT 305 to the input of switch 306. As counter 304 is incremented, the appropriate sequence of addresses for the coefficients stored in coefficient store 307 is output from LUT 305. As these addresses are applied to coefficient store 307, coefficients from the specified address are output on line 331. This procedure continues until all addresses corresponding to count of $M \times N \times P$ have been output, and thus all coefficients have been accounted for. For each new input block of coefficients, the entire process is repeated. In summary, the contents of LUT 305 determine the sequence or order in which coefficients held in coefficient store 307 are read out. The desired sequence is explained in more detail below, in conjunction with FIGS. 5-8.

The arrangement and operation of 2D/3D scan to block formatter 210 is generally similar to that of block to scan formatter 207 shown in FIG. 3. However, in this instance, the contents of LUT's 303 and 305 are arranged to so that coefficients presented in the order selected by formatter 207 are re-ordered to attain their original positions. This is done so that an inverse transformation may be performed in transformation circuit 212. Since formatter 207 may skip (i.e., not select) certain coefficient blocks, these blocks may be represented in the output of formatter 210 as having zero value. In other words, since the energy represented by these non-selected coefficient blocks is low, no contribution is needed from these blocks during the reconstruction process.

In FIG. 4, a block diagram of a decoder arranged in accordance with present invention is shown. The operation of the decoder is generally similar to that of the portion of the encoder that forms local reconstructed values. While many of the components are the same as components found in the encoder, there are some differences.

The incoming bit stream on line 400 is placed in a buffer 409 and then applied to a variable word length decoder 408. This circuit demultiplexes the applied signal to separate and recover the motion vectors that were encoded along with the DCT coefficients. It also decodes the variable word length codes to recover the DCT coefficients that were selected by formatter 207 of FIG. 2. Numerous commercially available devices which implement the above certified CCITT H.261 reference may be used for this purpose.

With respect to intraframe and predictive coded frames, received coefficients correspond to 2D blocks of intensity values. For computing the reconstruction for these frames, the DCT coefficients are reordered in formatter 407, which is identical to formatter 210 of FIG. 2. The coefficients are "unnormalized" in the dequantizer 406, and then inverse transformed in transformation circuit 405 to produce a 2D block of intensity values. These values form a first input to the adder 404. The output of switch 410 forms the other input to the adder 404. However, this output to set to zero for intraframe coding, by virtue of the low INTRA control signal applied to switch 410. Switch 402 is in closed position during recovery of intraframe and predicted coded frames, since the INTP control signal is low. This allows the reconstructed frame available at the output of switch 402 to be stored in either of frame stores 420 or 421, depending on the status of switches 422 and 423. The reconstructed frame is also available as an input to switch 401, which outputs that frame on line 450 to a display or other utilization device, such as a compact video disk.

For intraframe coded frames, the INTRA control signal is high, positioning switches 418 and 419 in open position, thus disconnecting the rest of the circuit of FIG. 4. This is done because intraframe coded frames are recovered without reference to other frames.

For recovery of frames encoded using predictive coding, switches 418 and 419 are closed, (INTRA is low) connecting the output of frame stores 420 and 421 to switches 416 and 417, which route intensity values for previously processed stored frames to switch 415 for prediction of the intensity values of the presently processed frame. The predicted values are added to the error signal applied to adder 404 via transformation circuit 405 to yield the recovered frame. Depending on the status of the F0 control signal, switch 415 selects between the contents of frame stores 420 or 421, and feeds the appropriate frame to motion compensated (MC) predictor 413. Meanwhile, the demultiplexed motion vectors from decoder 408 are input to motion compensated predictor 413 via switch 414, which is positioned by the low INTP control signal. Predictor 413 outputs a prediction block which is allowed to pass through switches 411 and 410 to the second input to added circuit 404. Thus, it is seen that the feedback loop is completed: prediction errors available at the first input of adder circuit 404 are combined with the predicted value of the frame to yield a reconstructed version of the frame that is output via switch 401 and also fed back to frame stores 420 and 421 for use in reconstruction of subsequent frames, either by MCP or CMCI processing.

For reconstruction of frames encoded using CMCI coding, selected DCT coefficients that correspond to a 3D block of intensity values are recieved on line 400. The coefficients are reordered in scan to block formatter 407, and then applied to dequantizer 406, and inverse transformed in IDCT transformation circuit 405 to produce a 3D block of intensity error values which forms a first input to adder 404. The output of switch 410 forms the other input to adder 404, and represents the reconstructed value of the frame itself. Because the INTP control signal is high during recovery of interpolated frames, switch 402 is in its closed position, allowing P reconstructed frames to be stored in frame store 403. At the appropriate times, switch 401 is closed by the store control signal on line 451, passing stored frames to a display or other utilization device. The latter signal is generated such that the frames are reconstructed in the same order as they were presented. In the example of FIG. 1, frame 101 is recovered first, using intraframe decoding. Then, frame 106 is recovered, using motion compensated prediction. Finally, intermediate frames 102-105 are recovered, using interpolation (or, in some instances, motion compensation prediction). These latter frames are stored in frame store 403, and then read out when needed.

Continuing with the description of recovery of CMCI coded frames, the reconstructed frames stored previously in frame stores 420 and 421 are applied to switches 418 and 419, which are in closed position (INTRA control is low) and further routed through switches 416 and 417 (INTP control signal high), feeding CMCI estimator 412. Meanwhile, the demultiplexed motion vectors from decoder 408 are input to CMCI estimator 412 via switch 414. Estimator 412 outputs an estimate of the intensity values of the present frame computed by interpolation from the stored reference frames, which estimate is passed through switches 411 and 410 and forms the second input to adder circuit 404. In this way, the error signal output from transformation circuit 405 is combined with the estimated frame output from CMCI estimator 412 to yield the next reconstructed frame.

So far, we have discussed generally some details of the method in accordance with this invention employed to select significant 3D transform coefficients in formatter 207. We formulate some basic terminology necessary to help understand additional details of this selection method. To better understand the method conceptually, it is helpful to first calculate the number of groups into which the coefficients may be divided, such that each group contains coefficients having approximately the same "energy" or significance in terms of the encoding process. The process of forming groups can be conceptualized visually as the formation of spatial planes each encompassing a given number of coefficients. In the discussion that follows, "groups" and "planes" may be thoughts of as analogies. It is also helpful to compute the number of coefficients per group (or per plane).

For meaningful values (non-zero and positive integer powers of 2) of M, N, and P, the total number of groups (planes) is given by:

$$S = M + N + P - 2 \qquad (9)$$

Table 2 will illustrate equation (9).

TABLE 2

| Block Size<br>M × N × P | Total Groups (Planes)<br>S |
| --- | --- |
| 2 × 2 × 2 | s = 2 + 2 + 2 − 2 = 4 |
| 2 × 2 × 4 | s = 2 + 2 + 4 − 2 = 6 |
| 4 × 4 × 4 | s = 4 + 4 + 4 − 2 = 10 |
| 8 × 8 × 4 | s = 8 + 8 + 4 − 2 = 18 |

The total number of coefficients in a 3D block is given by, $$M \times N \times P = \sum_{i=0}^{S-1} C_i = C_0 + C_1 + \ldots + C_{S-1} \qquad (10)$$

where $C_i$ is the number of coefficients in the group (plane) i. We note that, of all the groups (planes) indexed by i = 0, 1, ..., S−1, only the first half are unique, and that the others can be obtained by mirror image like symmetry.

Rather than attempt to generalize a relation for computing the number of coefficients in a group (plane) for any size block, we present as an example, a simplified relation that works for a subset of all cases. The number of coefficients per group (plane) $C_i$ can be computed for blocks of sizes (M=N=2, P=2), (M=N=2, P=4), (M=N=4, P=4), and (M=N=8, P=4), by applying the following conditions to equation (11).

Conditions (1) The groups (planes)

$$C_0, \ldots C_{\frac{S}{2}-1},$$

are unique, others follow mirror image symmetry.

(2) If (i<P), set $j_{lo}=1$ and $j_{hi}=i+1$; if necessary, modify j according to condition (4).

(3) If (i<P), set $j_{lo}=i-2$ and $j_{hi}=i=1$; if necessary, modify j according to condition (4).

(4) If (j>N), set j=j−2.

With the preceding conditions in mind, the rule used to evaluate $C_i$ is:

$$C_i = \sum_{j=j_{lo}}^{j_{hi}} j \qquad (11)$$

Table 3 shows the results when the above stated conditions are applied to equation (11), for the cases of interest.

TABLE 3

| Plane, i | Block size | | | |
| --- | --- | --- | --- | --- |
| | 2 × 2 × 2 | 2 × 2 × 4 | 4 × 4 × 4 | 8 × 8 × 4 |
| 0 | $C_0 = 1$ | $C_0 = 1$ | $C_0 = 1$ | $C_0 = 1$ |
| 1 | $C_1 = 1 + 2 = 3$ | $C_1 = 1 + 2 = 3$ | $C_1 = 1 + 2 = 3$ | $C_1 = 1 + 2 = 3$ |
| 2 | | $C_2 = 1 + 2 + 1^* = 4$ | $C_2 = 1 + 2 + 3 = 6$ | $C_2 = 1 + 2 + 3 = 6$ |
| 3 | | | $C_3 = 1 + 2 + 3 + 4 = 10$ | $C_3 = 1 + 2 + 3 + 4 = 10$ |
| 4 | | | $C_4 = 2 + 3 + 4 + 3^* = 12$ | $C_4 = 2 + 3 + 4 + 5 = 14$ |
| 5 | | | | $C_5 = 3 + 4 + 5 + 6 = 18$ |
| 6 | | | | $C_6 = 4 + 5 + 6 + 7 = 22$ |
| 7 | | | | $C_7 = 5 + 6 + 7 + 8 = 26$ |
| 8 | | | | $C_8 = 6 + 7 + 8 + 7^* = 28$ |

*This value is obtained after modification by condition 4.

Figure 5:
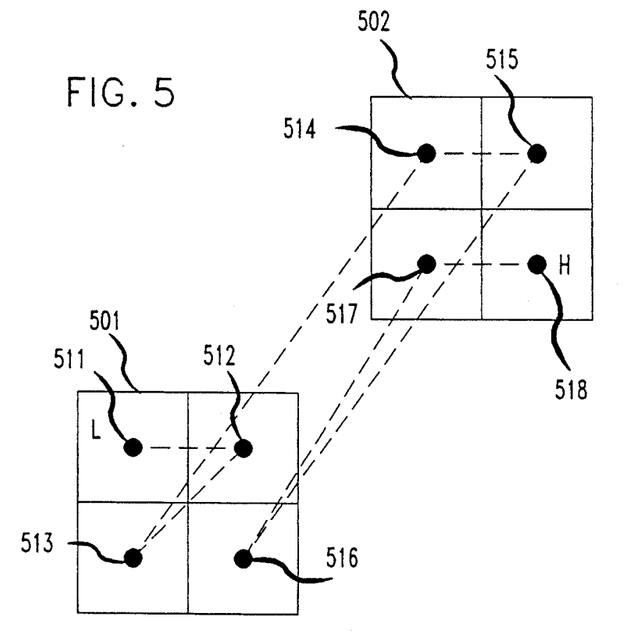
FIG. 5 illustrates an example of "zig-zag-zog" scan of a 2×2×2 block of FIG. 5.
Figure 6:
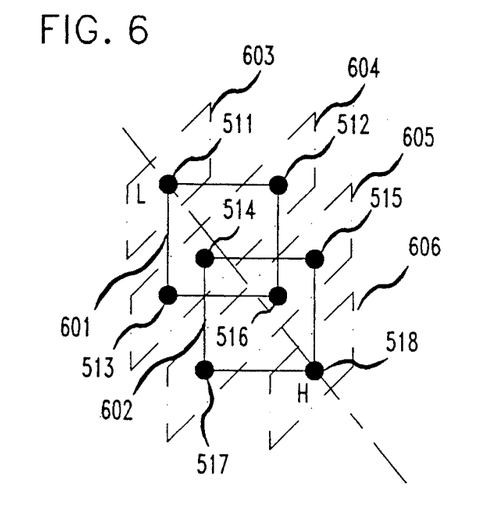
FIG. 6 illustrates grouping of coefficients in the 2×2×2×block of FIG. 5.

The results expressed in equation 11 and in Table 1 above can be explained graphically by reference to FIGS. 5–8. FIG. 5 illustrates the case of a 2×2×2 block of 8 coefficients 511–518 that are formed from a 2×2 array of pels in each of frames 501 and 502. In FIG. 6, the same 8 coefficients 511–518 are shown as lying on 4 planes 603–606. Also the original frames 501 and 502 are shown in FIG. 6 for reference purposes. As discussed earlier, each plane 601–604 consists of coefficients with nearly the same energy or spatio-temporal frequencies. Thus, each plane contains coefficients of approximately equal significance. Moreover, the planes can also be classified in terms of increasing frequencies from low, as in plane 601, to high, as in plane 604.

This means that in the coefficient selection process performed in formatter 207, all of the coefficients in plane 601 should be used before any others. In this example, coefficient 511 is thus processed first. Next, all of the coefficients in plane 602 should be used. In this example, coefficients 512–514 are processed next. If additional coefficients are used, they are preferably coefficients 515–517 on plane 603. Finally, coefficient 518 on plane 604 has the least significance, and is processed last. Of course, the processing of coefficients is usually truncated, so that less than all of the coefficients is used. The exact number used is a function of channel capacity, other encoder design considerations, and other factors determined by persons skilled in the art.

In summary, an important feature of the present invention is the method of selecting DCT coefficients that are most significant when 3D coding is used. The selection is accomplished by grouping coefficients into several groups each having approximately the same significance. The groups are represented by planes in FIGS. 5 and 6. Once the grouping is complete, the coefficients from the more significant groups are processed before coefficients of less significant groups. The actual order in which processing occurs is implemented in formatter 207 of FIG. 2. More specifically, LUT 305 of FIG. 3 is loaded with addresses that correspond to the desired sequence of coefficients. When coefficients are loaded into coefficient store 307, they are written in a first order. When the same coefficients are read out of coefficient store 307 under the control of LUT 305, they are re-ordered. In the example of FIGS. 5 and 6, the output order of coefficients is 511 to 518. The input order for the coefficients is 511, 512, 513, 516, 514, 515, 517, 518, since the coefficients are input from frame 501 first, then from frame 502; in frame 501, the first row is processed left to right, then the second row.

Figures 7, 8:
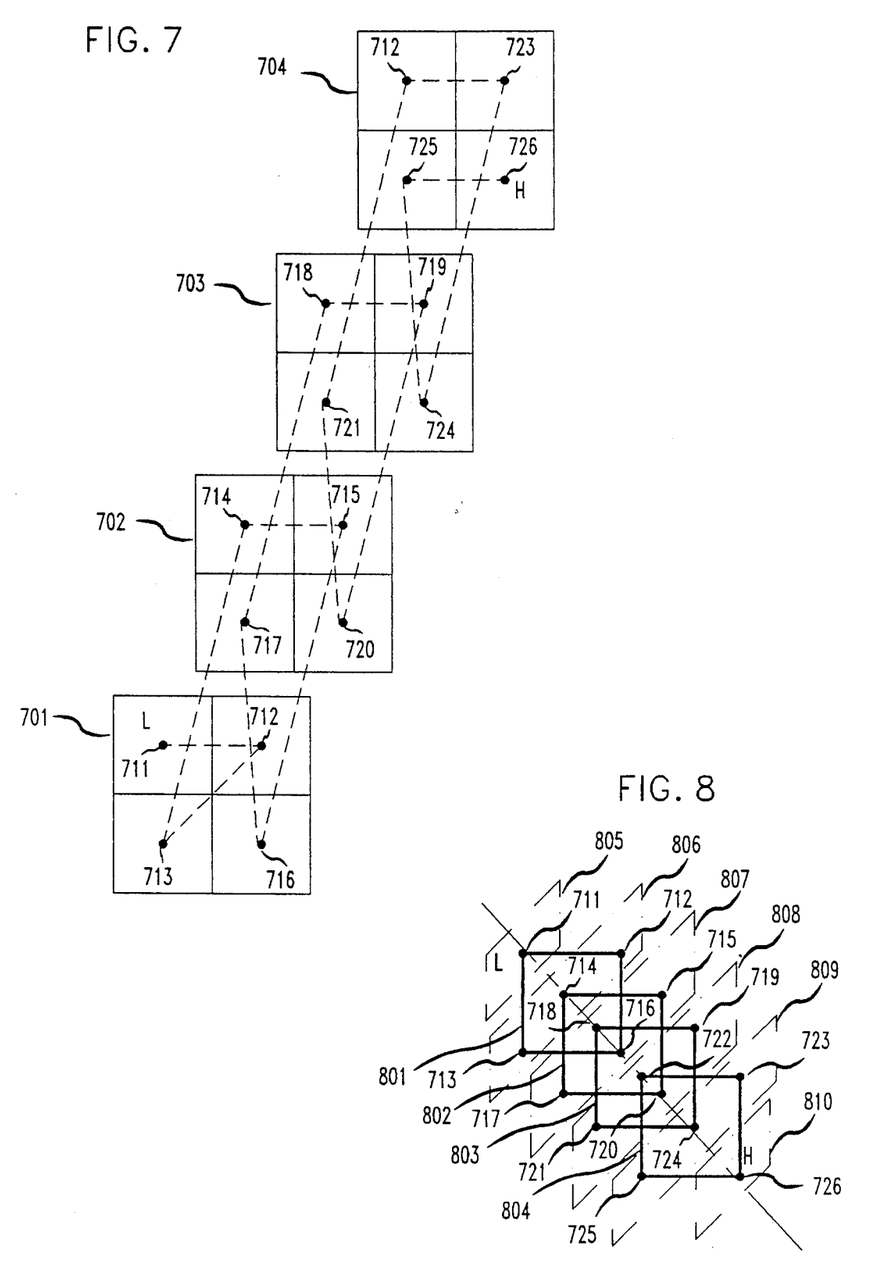
FIG. 7 shows an example of a "zig-zag-zog" scan of a 2×2×4 block of coefficients.
FIG. 8 shows grouping of coefficients in the 2×2×4 block of coefficients of FIG. 7.

Another example, shown in FIGS. 7 and 8, will also be helpful. In FIG. 7, a 4×4×4 array of coefficients 711-726 are located on frames 701-704, four per frame. In accordance with the invention, these coefficients are grouped in planes 801-806 in FIG. 8. In this example, the lowest frequency plane is 801, containing coefficient 711, while the highest frequency plane is 806, containing coefficient 726. If it is desired to truncate coefficient processing after 7 out of 16 coefficients are processed, then they are advantageously coefficients 711-718 on planes 801-803. All of the others (coefficients 719-726) would be discarded.

It is to be noted here that while the present invention can be used both in conjunction with traditional interframe predictive coding as described above as well as with CMCI, it can also be used in the more recent group of frames (GOF) based coding, as discussed by A. Puri and R. Aravind, in a paper entitled "On Comparing Motion Interpolation Structures for Video Coding," *Proc. SPIE Visual Commun. and Image Processing*, Lausanne, October 1990, and elsewhere.

As mentioned above, the present invention may also be used when motion compensated prediction is used to form estimates of intensities of pels in frames 102-105 of FIG. 1, rather than motion compensated interpolation. In this instance, estimates of movements of objects are computed with respect to frame 101, and estimates of intensities of objects computed at these displaced locations are differenced with intensities of pels in original frames 102, 103, 104 and 105 to calculate corresponding MCP error frames. In this case, each two dimensional M×N block of error values in P=4 frames 102, 103, 104 and 105, are combined to form 3D blocks of M×N×P values, such as block 112. Thus, the 3D blocks of MCPE, rather than MCIE values are jointly coded by DCT encoding. The process for selection of significant coefficients remains the same.

It is to be noted that if desired, any of the frames 106, 111 or succeeding similar frames, may be coded by intraframe coding instead of motion compensated predictive coding. In such event, frames 101, 106, 111 etc. are reference frames and the intervening frames such as frames 102-105 would nevertheless be encoded using motion compensated interpolation. In yet another embodiment of the invention, 2D or 3D DCT encoding on interpolation frames 102, 103, 104, and 105, may be selected adaptively, on a block by block basis, depending on the characteristics of the input video.

I claim:

1. A method of encoding a signal representing the actual intensity values of picture elements (pels) in a series of frames, comprising the steps of
    (i) computing estimates of the values of pels in at least two intermediate frames which lie between reference frames, based on the values of pels in at least one of said reference frames;
    (ii) combining error values for corresponding blocks of pels in each of said intermediate frames to form a series of transform coefficients representing said error values, each of said error values representing the difference between said estimated value and said actual value of said pel, and
    (iii) selecting ones of said coefficients for further processing based upon the significance of information represented by said coefficients,
    wherein said selection step includes
    (a) grouping said coefficients into a plurality of groups each containing coefficients having approximately the same significance, and
    (b) selecting all coefficients from only selected ones of said groups.

2. The invention defined in claim 1, wherein said computing step includes
    (a) computing estimates of motion of objects in said frames, and
    (b) predicting the values of said pels based upon said motion estimates and the values of corresponding pels in at least one of said reference frames.

3. The invention defined in claim 1, wherein said computing step includes
    (a) computing estimates of motion of objects in said frames, and
    (b) interpolating the values of said pels based upon said motion estimates and the values of corresponding pels in at least two of said reference frames.

4. The invention defined in claim 1
    wherein said computing step includes computing estimates for P intermediate frames, each of said P frames including an M×N block of pels, and
    wherein said grouping step includes forming up to S=M+N+P−2 groups of coefficients.

5. A method of encoding a video signal representing the actual intensity values of picture elements (pels) in a series of frames, comprising the steps of
    (i) computing estimates of the intensity values of pels in at least two intermediate frames which lie between reference frames, based on the intensity values of pels in at least one of said reference frames;
    (ii) combining error values for corresponding blocks of pels in each of said intermediate frames to form a series of transform coefficients representing said error values, each of said error values representing the difference between said estimated intensity value and said actual intensity value of said pel,
    (iii) selecting ones of said coefficients for further processing based upon selected characteristics of said coefficients, and
    (iv) encoding said selected coefficients to produce a representation of said video signal,
    wherein said intensity estimate computing step includes (a) forming estimates of the motion of objects in said frames, and (b) calculating said intensity estimates as a function of said motion estimates.

6. The invention defined in claim 5, wherein said intensity estimates calculation is formed using motion compensated prediction.

7. The invention defined in claim 5, wherein said intensity estimates calculation is formed using conditional motion compensated interpolation.

8. The invention defined in claims 1 or 5, wherein said combining step includes forming discrete cosine transform coefficient $c(j,k,l)$ for each of said blocks of pels $s(m,n,p)$.

9. The invention defined in claim 8 wherein said block of pels is of size $M \times N \times P$, and wherein:

$$c(j,k,l) = Za(j)a(k)a(l) \sum_{m=0}^{M-1} \sum_{n=0}^{N-1} \sum_{p=0}^{P-1} s(m,n,p) \cos \frac{(2m+1)j\pi}{2M} \cos \frac{(2n+1)k\pi}{2N} \cos \frac{(2p+1)l\pi}{2P}$$

where, $$a(u) = \begin{cases} \frac{1}{\sqrt{2}} & u = 0 \\ 1 & u \neq 0 \end{cases}$$

and $$Z = \sqrt{\frac{2}{M}} \sqrt{\frac{2}{N}} \sqrt{\frac{2}{P}}$$

10. A method of encoding a signal representing the intensity values of picture elements (pels) in a series of frames, comprising the steps of computing error values $s(m,n,p)$ for three dimensional blocks of pels, said 3D blocks including $M \times N$ pels in each of $P$ of said frames;

forming $M \times N \times P$ discrete cosine transformation coefficients $c(j,k,l)$ for each of said 3D blocks of error values;

grouping said coefficients into S groups, each of said groups containing coefficients having approximately the same energy, and selecting coefficients only from ones of said groups to represent said signal.

11. The method of claim 10, wherein said computing step includes forming said error values using conditional motion compensated interpolation (CMCI).

12. The method of claim 10, wherein said computing step includes forming said error values using motion compensated prediction (MCP).

13. The invention defined in claims 11 or 12 wherein said transformation coefficients $c(j,k,l)$ are given by:

$$c(j,k,l) = Za(j)a(k)a(l) \sum_{m=0}^{M-1} \sum_{n=0}^{N-1} \sum_{p=0}^{P-1} s(m,n,p) \cos \frac{(2m+1)j\pi}{2M} \cos \frac{(2n+1)k\pi}{2N} \cos \frac{(2p+1)l\pi}{2P}$$

where, $$a(u) = \begin{cases} \frac{1}{\sqrt{2}} & u = 0 \\ 1 & u \neq 0 \end{cases}$$

and $$Z = \sqrt{\frac{2}{M}} \sqrt{\frac{2}{N}} \sqrt{\frac{2}{P}}$$

14. The invention defined in claim 13 wherein $M=N=8$, $P=4$, and wherein $S=18$ groups $C_0$ through $C_{17}$, said groups having coefficients as follows:

| Group | Number of Coefficients |
|---|---|
| $C_0$ | 1 |
| $C_1$ | 3 |
| $C_2$ | 6 |
| $C_3$ | 10 |
| $C_4$ | 14 |
| $C_5$ | 18 |
| $C_6$ | 22 |
| $C_7$ | 26 |
| $C_8$ | 28 |
| $C_9$ | 28 |
| $C_{10}$ | 26 |
| $C_{11}$ | 22 |
| $C_{12}$ | 18 |
| $C_{13}$ | 14 |
| $C_{14}$ | 10 |
| $C_{15}$ | 6 |
| $C_{16}$ | 3 |
| $C_{17}$ | 1 |

15. Apparatus for encoding a signal representing the actual intensity values of picture elements (pels) in a series of frames, comprising (i) means for computing estimates of the values of pels in at least two intermediate frames which lie between reference frames, based on the values of pels in at least one of said reference frames;

(ii) means for combining error values for corresponding blocks of pels in each of said intermediate frames to form a series of transform coefficients representing said error values, each of said error values representing the difference between said estimated value and said actual value of said pel, and (iii) means for selecting one of said coefficients for further processing based upon the significance of information represented by said coefficients, wherein said selection means includes means for grouping said coefficients into a plurality of groups each containing coefficients having approximately the same significance and for selecting all coefficients from only selected ones of said groups.

16. The invention defined in claim 15, wherein said computing means includes
   (a) means for computing estimates of motion of objects in said frames, and
   (b) means for predicting the values of said pels based upon said motion estimates and the values of corresponding pels in at least one of said reference frames.

17. The invention defined in claim 15, wherein said computing means includes
   (a) means for computing estimates of motion of objects in said frames, and
   (b) means for interpolating the values of said pels based upon said motion estimates and the values of corresponding pels in at least two of said reference frames.

18. Apparatus (FIG. 2) for encoding a video signal representing the actual intensity values of picture elements (pels) in a series of frames, comprising
   (i) means (210-228) for computing estimates of the intensity values of pels in at least two intermediate frames which lie between reference frames, based on the intensity values of pels in at least of said reference frames;
   (ii) means (205) for combining error values for corresponding blocks of pels in each of said intermediate frames to form a series of transform coefficients representing said error values, each of said error values representing the difference between said estimated intensity value and said actual intensity value of said pel,
   (iii) means (207) for selecting ones of said coefficients for further processing based upon selected characteristics of said coefficients, and
   (iv) means (208) for encoding said selected coefficients to produce a representation of said video signal, wherein said intensity estimate computing means includes
   (a) means (228) for forming estimates of the motion of objects in said frames, and
   (b) means (215 and 217) for calculating said intensity estimates as a function of said motion estimates.

19. Apparatus for encoding a signal representing the intensity values of picture elements (pels) in a series of frames, comprising
   means for computing error values $s(m,n,p)$ for three dimensional blocks of pels, said 3D blocks including $M \times N$ pels in each of P of said frames;
   means for forming $M \times N \times P$ discrete cosine transformation coefficients $c(j,k,l)$ for each of said 3D blocks of error values; and
   means for grouping said coefficients into S groups, each of said groups containing coefficients having approximately the same energy and selecting coefficients only from ones of said groups to represent said signal.

20. A method of encoding a video signal representing the acutal intensity values of picture elements (pels) in a series of frames, comprising the steps of
   (i) computing estimates of the intensity values of pels in at least two intermediate frames which lie between reference frames, based on the intensity values of pels in said reference frames and on motion of objects in said frames;
   (ii) combining error values for blocks of pels to form a series of transform coefficients representing said error values, each of said error values representing the difference between said estimated intensity value and said actual intensity value of said pel,
   (iii) selecting ones of said coefficients for further processing based upon selected characteristics of said coefficients, and
   (iv) encoding said selected coefficients to produce a representation of said video signal,
   wherein said combining step includes:
   (a) calculating DCT coefficients for two dimensional blocks of $M \times N$ pels per some blocks of said frames; and
   (b) calculating DCT coefficients for three dimensional blocks of $M \times N$ pels in corresponding locations in each of P frames for other blocks of said frames.

21. The invention defined in claim 20 further including the step of adaptively switching between said last mentioned calculating steps.

* * * * *